United States Patent Office 3,506,681
Patented Apr. 14, 1970

3,506,681
DERIVATIVES OF MITOMYCIN AND
PREPARATION OF THE SAME
Masanao Matsui, Tokyo, Keizo Uzu, Shizuoka-ken, and Yasuhiro Yamada and Shigetoshi Wakaki, Tokyo, Japan, assignors to Kyowa Hakko Kogyo Co., Ltd., Tokyo, Japan, a corporation of Japan
Continuation-in-part of application Ser. No. 472,823, July 19, 1965. This application Mar. 13, 1968, Ser. No. 712,734
Claims priority, application Japan, Aug. 25, 1964, 39/47,829
Int. Cl. C07d 27/38
U.S. Cl. 260—326.3                        2 Claims

ABSTRACT OF THE DISCLOSURE

The compounds 1a-crotonylmitomycin C and 1a-o-toluylmitomycin C. They are prepared by reacting mitomycin C with crotonyl chloride or crotonic acid anhydride, respectively, in the presence of trimethylamine as acid-binding agent.

---

Figure 1:
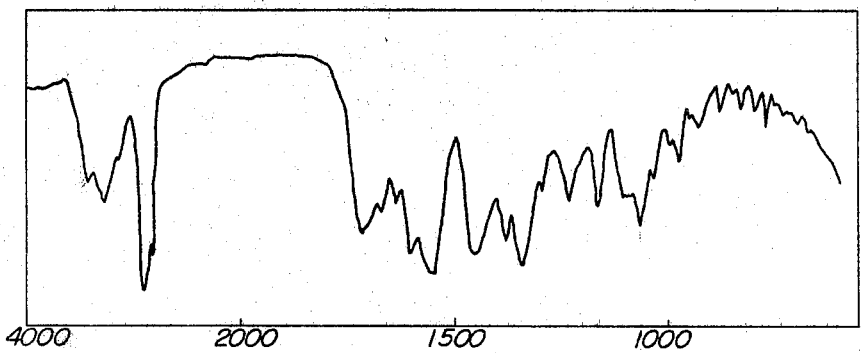

The present application is a continuation-in-part of application Ser. No. 472,823, filed in the United States Patent Office on July 19, 1965, and now abandoned.

The present invention relates to new antibiotics, more particularly to new derivatives of mitosane compounds.

In 1956, Hata et al. isolated new antibiotics from the fermented broth of *Streptomyces caespitosus* and named the antibiotics mitomycin A and B. In 1958, Wakaki et al. isolated a third antibiotic from the same broth and named it mitomycin C. Since then it has been determined that the chemical composition of the three compounds is as follows:

Mitomycin A

Mitomycin B

Mitomycin C

Generically, these compounds correspond to the formula wherein

| | A | B | C |
|---|---|---|---|
| α is | OCH₃ | OCH₃ | NH₂ |
| β is | OCH₃ | OH | OCH₃ |
| γ is | H | CH₃ | H |

These compounds thus have the following skeleton:

and are called mitosane compounds.

Mitomycin A, B and C are excellent antibiotics, but they have a defect in that they are toxic to human blood. In order to obtain less toxic mitosane compounds, some research has been conducted even before the determination of the chemical composition of mitomycin A, B and C; for example, monomethyl-mitomycin C or porfiromycin was synthesized by reacting mitomycin C and methyl iodide in the presence of potassium carbonate. After the determination of the chemical composition of mitomycin A, B and C, research to obtain derivatives has been actively conducted. For example, Belgian Patent 624,559 provides some 6, 7 and 1a-substituted derivatives of mitosane compounds.

The present invention is concerned with novel mitosane derivatives of reduced toxicity and of correspondingly enhanced utility as antibiotics, and to the preparation thereof.

The new antibiotics of the present invention are:

1a-o-toluyl-mitomycin C and
1a-crotonyl-mitomycin C which can be prepared according to the following reaction scheme:

wherein —COR represents the appropriate acyl group, the reaction being carried out in the presence of an acid-binding agent.

The following examples set forth presently preferred illustrative, but not limitative, embodiments of the present invention.

EXAMPLE 1

1a-crotonyl-mitomycin C 1 g. (gram) of mitomycin C is dissolved in 50 ml. (milliliters) of dry tetrahydrofuran, after which 2 ml. of triethylamine is added. To the solution, 350 mg. (milligrams) of crotonic acid chloride in dry benzene is added dropwise at room temperature with stirring. After the addition, the mixture is stirred for 5 more minutes. The reaction mixture is filtered to remove triethylamine hydrochloride, and the filtrate is concentrated under reduced pressure. The resulting residue is dissolved in ethyl acetate and passed through a silica-gel column. Developing and eluting are carried out using ethyl acetate. The purple band of the objective product is eluted as the main fraction. The fraction is concentrated in vacuo, followed by the addition of a mixture of methanol and ethanol. 650 mg. of 1a-crotonyl-mitomycin C, as purplish brown amorphous powder, is obtained.

*Analysis.*—Calc'd for $C_{19}H_{22}O_6N_4$ (percent): C, 56.71; H, 5.51; N, 13.92. Found (percent): C, 56.41; H, 5.02; N, 13.80.

The infra-red spectrum in Nujol is shown in FIGURE 1.

EXAMPLE II

1a-o-toluyl-mitomycin C 1 g. of mitomycin C is dissolved in 50 ml. of dry tetrahydrofuran, after which 2 ml. of triethylamine is added. To the solution, 400 mg. of o-toluyl chloride in dry benzene is added dropwise with stirring at room temperature. After the addition, the mixture is stirred for 5 more minutes and the precipitated triethylene hydrochloride is filtered off. The filtrate is concentrated under reduced pressure and the resulting residue is dissolved in ethyl acetate. The chromatographic treatment is conducted as described in Example I. Crystallization is conducted using ethyl acetate, to yield 1a-o-toluyl-mitomycin C.

*Analysis.*—Calc'd for $C_{23}H_{24}O_6N_4$ (percent): C, 61.05; H, 5.35; N, 12.33. Found (percent): C, 60.80; H, 5.46; N, 12.50.

Figure 2:
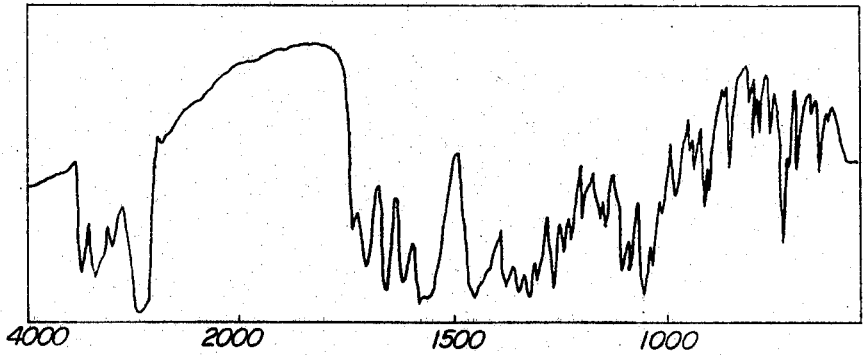

The infra-red spectrum in Nujol is shown in FIGURE 2.

The $LD_{50}$ (mg./kg.-mouse) of the compounds obtained in Examples I and II, as well as that of mitomycin C as a comparison, are shown in Table 1.

Table 1

| | $LD_{50}$(mg./kg.-mouse) |
|---|---|
| 1a-crotonylmitomycin C | 75 |
| 1a-o-toluylmitomycin C | 150 |
| Mitomycin C | 9 |

The minimum inhibition concentrations of the compounds of the present invention are shown in Table 2. This data shows the amount required to inhibit the growth of various typical bacteria. Determination thereof was made in the standard manner using the agar-dilution streak-plate technique. It can be readily seen therefrom that the novel compounds of the present invention are useful as anti-bacterial agents, since they possess broad-spectrum anti-bacterial activity.

TABLE 2.—MINIMUM INHIBITION CONCENTRATION (MCG./ML.)

| | 1a-crotonyl-mitomycin C | 1a-o-toluyl-mitomycin C |
|---|---|---|
| *Staphylococcus aureus*, 209 P | 0.195 | 3.12 |
| *Sarcina lutea*, PCI 1001 | 0.39 | 6.25 |
| *Bacillus subtilis*, ATCC 6633 | 0.195 | 3.12 |
| *Salmonella typhi*, 379 | 3.12 | 50 |
| *Shigella flexneri*, Za 3196 | 1.56 | 25 |
| *Klebsiella pneumoniae*, 0/10 | 3.12 | 25 |
| *Proteus*, X19 | 3.12 | 25 |
| *Escherichia coli*, K-12 | 1.56 | 25 |
| *Pseudomonas aeruginosa*, 35 | 3.12 | 25 |
| *Vibrio comma*, 62 | 0.024 | 0.39 |
| *Mycobacterium tuberculosis*, 607 | 0.195 | 0.78 |
| *Streptococcus haemolyticus*, 68 | 0.39 | 6.25 |
| *Diplococcus pneumoniae*, 1-19 | 0.048 | 0.195 |
| *Corynebacterium diphtheriae*, 92 | 0.048 | 0.78 |

We claim:
1. 1a-crotonylmitomycin C.
2. 1a-o-toluylmitomycin C.

References Cited

UNITED STATES PATENTS 3,226,393  12/1965  Meyer et al. _____ 260—295

ALEX MAZEL, Primary Examiner

U.S. Cl. X.R.

260—999